United States Patent
Kamin, Jr.

[19]

[11] Patent Number: 5,805,575
[45] Date of Patent: Sep. 8, 1998

[54] APPARATUS AND METHOD FOR PROVIDING A BEACON SIGNAL IN A WIRELESS COMMUNICATION SYSTEM

[75] Inventor: Ralph A. Kamin, Jr., Bedford, Tex.

[73] Assignee: Motorola, Inc., Schaumburg, Ill.

[21] Appl. No.: 697,107

[22] Filed: Aug. 19, 1996

[51] Int. Cl.$^6$ .................................................. H04J 13/00
[52] U.S. Cl. ...................... 370/335; 370/331; 370/342; 455/436
[58] Field of Search ................................ 370/335, 334, 370/331, 336, 527, 320, 342, 441, 479; 342/373, 354; 455/422, 436

[56] References Cited

U.S. PATENT DOCUMENTS

| | | | |
|---|---|---|---|
| 3,731,217 | 5/1973 | Gerst et al. | 330/56 |
| 4,213,132 | 7/1980 | Davidson | 343/854 |
| 4,907,004 | 3/1990 | Zacharatos et al. | 342/373 |
| 5,604,765 | 2/1997 | Bruno et al. | 370/527 |
| 5,610,617 | 3/1997 | Gans et al. | 342/373 |
| 5,628,052 | 5/1997 | DeSantis et al. | 455/33.3 |
| 5,646,631 | 7/1997 | Arntz | 342/373 |

*Primary Examiner*—Douglas W. Olms
*Assistant Examiner*—Shick Hom
*Attorney, Agent, or Firm*—Richard A. Sonnentag

[57] ABSTRACT

A beacon signal (313) is provided in a wireless communication system using a hybrid matrix (303) and an inverse hybrid matrix (306). Using an unused port of the hybrid matrix (303), the beacon signal (313) is combined with traffic signals (316) intended for users of the wireless communication system. The hybrid matrix (303) transforms beacon signal (313) and the traffic signals (316) into output signals that each contain a portion of the beacon signal (313) and the traffic signals (316). The outputs from the hybrid matrix (303) are amplified by amplifiers (315). The outputs from the amplifiers (315) are then inverse transformed by an inverse hybrid matrix (306). The inverse transform matrix (306) recombines the portions of the beacon signal (313) and the traffic signals (316) originally input to the hybrid matrix (303), and the resulting signals are transmitted using sector antennas (320) and a beacon antenna (323).

18 Claims, 2 Drawing Sheets

APPARATUS AND METHOD FOR PROVIDING A BEACON SIGNAL IN A WIRELESS COMMUNICATION SYSTEM

FIELD OF THE INVENTION

The present invention relates, in general, to communication systems and, more particularly, to an apparatus and method for providing a beacon signal in a wireless communication system.

BACKGROUND OF THE INVENTION

Presently, in wireless communications systems, such as a Code Division Multiple Access (CDMA) communication system, a design such as that shown in FIG. 1 is used. In FIG. 1, the prior art transmit portion 101 to support a six sector S1–S6 configuration is shown. The transmit portion 101 (shown for sector S1) consists of a radio channel unit 102 coupled to an amplifier 104, which in turn is coupled to an antenna 105. A voice/data signal 100 is transferred to the radio channel unit 102 from a public switched telephone network (PSTN). The radio channel unit 102 processes the voice/data signal 100 to produce a CDMA signal 103 as is well known in the art. The CDMA signal 103 is input into the amplifier 104 which amplifies the CDMA signal 103, and transmits the amplified CDMA signal to a mobile station (not shown in FIG. 1). This transmit portion 101 is replicated for each of the sectors S2–S6 as shown in FIG. 1.

One problem associated with a Code Division Multiple Access (CDMA) communication system is how to handle inter-system hard handoff. FIG. 2 generally depicts the problem. As shown in FIG. 2, a border 200 separates a first system A and a second system B, where each system A and B operate at different frequencies $F_1$ and $F_2$. In this embodiment, system A and system B are systems of different metropolitan trading areas (MTAs). A mobile station 203 moving from system A to system B requires a hard handoff from frequency $F_1$ to frequency $F_2$. As shown in FIG. 2, system B can be either another CDMA cellular communication system or can likewise be an analog cellular communication system (commonly referred to as AMPS).

One solution to the hard handoff problem is to present the mobile station 203 with a beacon signal 205 with which the mobile station 203 obtains information related to system B. The beacon signal 205 is transmitted by a beacon transmitter 206, and acts as a trigger to notify the mobile station 203 that a hard handoff into system B is required. Once the mobile station 203 receives the beacon signal 205, the process of hard handoff, which is well known in the art, can be initiated by the mobile station 203.

In the solution disclosed in FIG. 2, the beacon transmitter 206 which provides the beacon signal 205 is a stand alone transmitter and is not integrated into the transmit portion 101 of the base-stations (labeled A1, A2, B1, B2, etc.) of FIG. 2. As such, its complexity and cost are at least that of the transmit portion 101 depicted in FIG. 1. Therefore, a need exists for providing a beacon signal in a wireless communication system which is uncomplicated and cost effective.

DETAILED DESCRIPTION OF THE PREFERRED EMBODIMENT

Stated generally, a beacon signal is provided in a wireless communication system using a hybrid matrix and an inverse hybrid matrix. Using an unused port of the hybrid matrix, the beacon signal is combined with traffic signals intended for users of the wireless communication system. The hybrid matrix transforms beacon signal and the traffic signals into output signals that each contain a portion of the beacon signal and the traffic signals. The outputs from the hybrid matrix are amplified by amplifiers. The outputs from the amplifiers are then inverse transformed by an inverse hybrid matrix. The inverse transform matrix recombines the portions of the beacon signal and the traffic signals originally input to the hybrid matrix, and the resulting signals are transmitted using sector antennas and a beacon antenna.

Specifically, in the preferred embodiment, an apparatus for providing a beacon signal in a wireless communication system comprises a beacon signal generator for providing the beacon signal and a hybrid matrix having as an input the beacon signal and at least one traffic signal, the hybrid matrix having a plurality of output signals. The apparatus also comprises a plurality of amplifiers having as inputs the corresponding plurality of output signals from the hybrid matrix and having as an output a plurality of amplified output signals. The plurality of amplifiers are coupled to an inverse hybrid matrix, having as inputs the plurality of amplified output signals and which output the traffic signal and the beacon signal to a mobile station.

The hybrid matrix in this embodiment can either be a Fourier Transform matrix or a Butler matrix. The beacon signal is input into an unused port of the hybrid matrix, and provides the mobile station communicating on a first communication system handoff information related to a second communication system. The first communication system comprises a code division multiple access (CDMA) cellular communication system, while the second communication system comprises either a CDMA cellular communication system or an analog cellular communication system. The traffic signal intended for users of the CDMA cellular communication system is a voice/data signal processed to be compatible with the CDMA cellular communication system.

Figure 3:
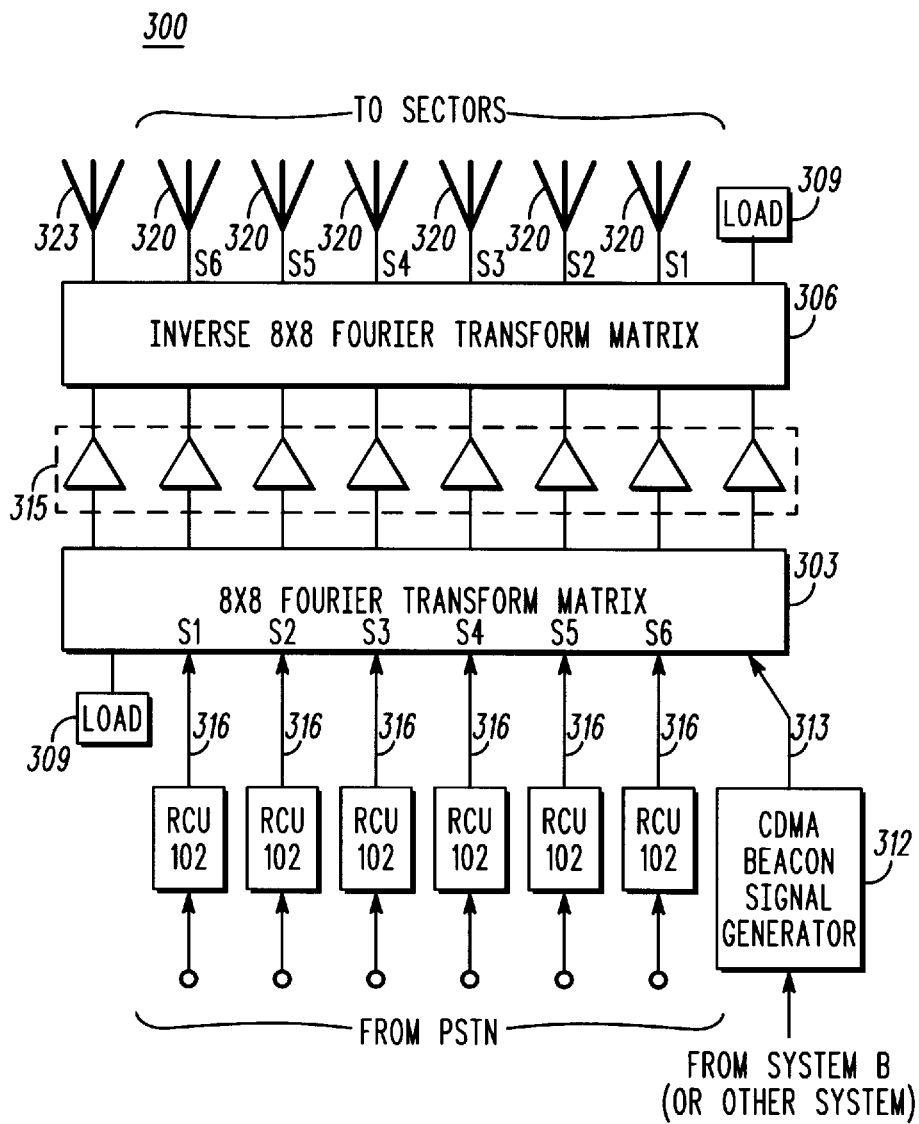
FIG. 3 is a block diagram of the transmit side of a base-station designed to implement the present invention.

FIG. 3 is a block diagram of the transmit side of a base-station designed to implement the present invention. As shown in FIG. 3, a hybrid matrix 303 and an inverse hybrid matrix 306 are utilized to provide the beacon signal in accordance with the invention. For more information on hybrid matrices, reference is made to U.S. Pat. No. 4,213,132 to Davidson, assigned to the assignee of the present invention, and herein incorporated by reference.

Figure 1:
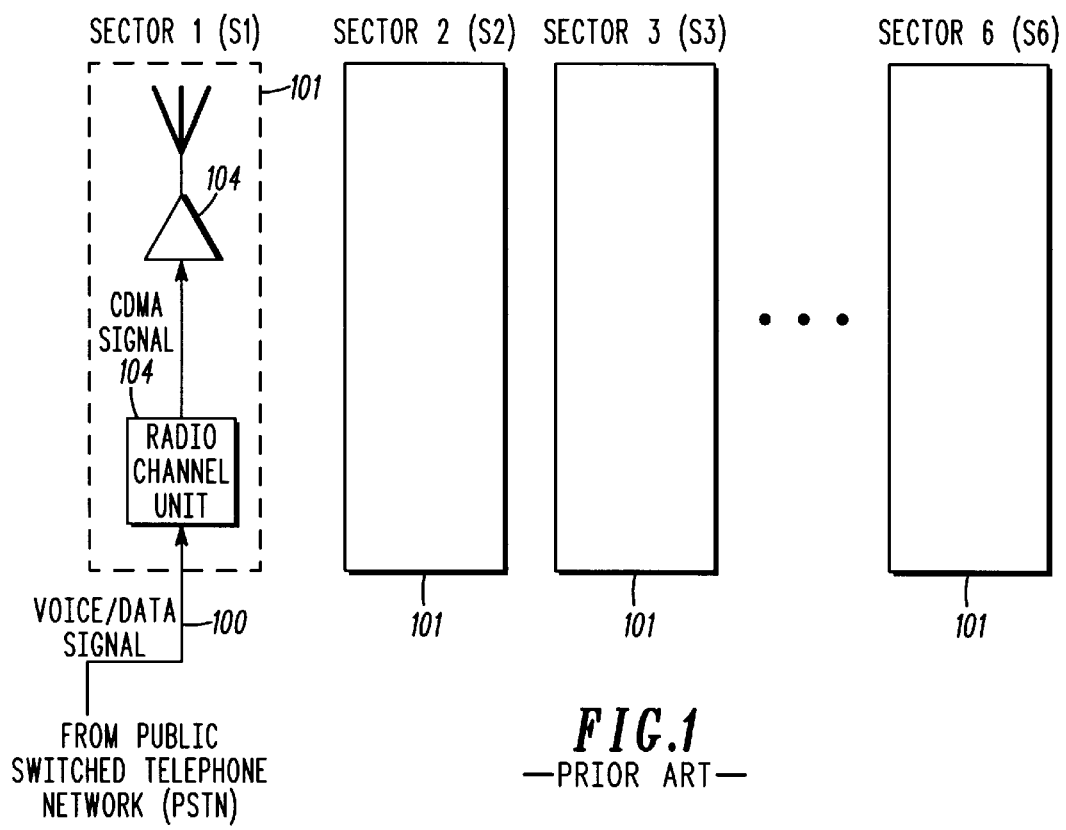
FIG. 1 is a block diagram of a prior art transmit portion used for wireless communication.
Figure 2:
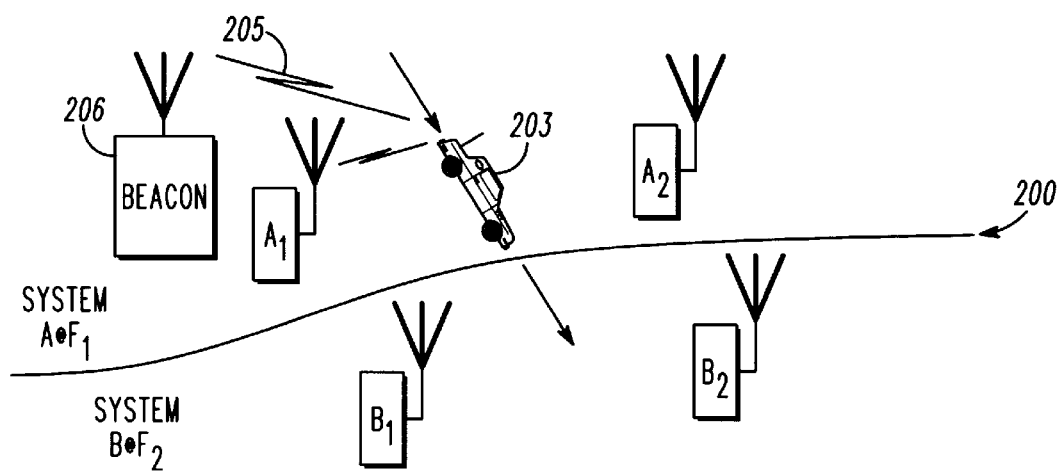
FIG. 2 generally illustrates the problem associated with hard handoff in a CDMA cellular communication system, and a prior art implementation of one solution to the problem.

Referring to FIG. 3, the radio channel units 102 of FIG. 1 have their outputs entering an 8×8 hybrid matrix 303. In the preferred embodiment, the hybrid matrix 303 and the inverse hybrid matrix 306 are of the Fourier Transform type. As one of ordinary skill in the art will appreciate other types of hybrid matrices, such as a Butler matrix, may be beneficially employed. In the configuration depicted in FIG. 3, the 8×8 Fourier Transform Matrix is used to provide cellular communication to six sectors S1–S6, thus two of the inputs/outputs of the matrix 303 and the inverse matrix 306 are unused.

The unused inputs/outputs of the matrix 303 and the inverse matrix 306 are used to provide a beacon signal in accordance with the invention. As shown in FIG. 3, the hybrid matrix 303 has as input traffic signals 316 intended for mobile stations in the six sectors S1–S6. One set of the unused inputs/outputs are terminated by a load 309, while the remaining unused input of the matrix 303 has as its input an a beacon signal 313 output from a CDMA beacon signal generator 312. When input into the unused port of the hybrid matrix 303, the beacon signal 313 is combined substantially equally with all other traffic signals 316. The hybrid matrix 303 transforms the beacon signal 313 and the traffic signals 316 into output signals that each contain a portion of the beacon signal 313 and the traffic signals 316. The outputs from the hybrid matrix 303 are amplified by amplifiers 315. In the preferred embodiment, the amplifiers 315 are single-tone wideband linear power amplifiers. Continuing, the outputs from the amplifiers 315 are then inverse transformed by an inverse hybrid matrix 306. The inverse transform matrix recombines the portions of the beacon signal 313 and the traffic signals 316 originally input to the hybrid matrix 303. The resulting signals are transmitted using sector antennas 320 and a beacon antenna 323.

The advantages of the implementation depicted in FIG. 3 are many. First, by implementing the hybrid matrix 303 and the inverse hybrid matrix 306, catastrophic failure to a component in any one chain of any one sector S1–S6 is avoided since the hybrid matrix 303 and the inverse hybrid matrix 306 distribute the power equally to the sector antennas 320 and the beacon antenna 323. Also, since the hybrid matrix 303 and inverse hybrid matrix 306 are already implemented in the base-station, and the beacon signal 313 is provided in unused ports of the hybrid matrix 303 and inverse hybrid matrix 306, the addition of expensive amplifiers and antennas to provide the beacon signal (as in the prior art) is unnecessary. Since existing equipment is implemented, no additional complexity is added to the base-station to provide the beacon signal.

As one of ordinary skill in the art will appreciate, many different variations of FIG. 3 may be beneficially implemented to provide a beacon signal in accordance with the invention. For example, instead of using an 8×8 hybrid matrix for six sector operation, a 4×4 hybrid matrix could be implemented for three sector operation. Again, the unused port of the 4×4 hybrid matrix would have the beacon signal 313 as an input.

While the invention has been particularly shown and described with reference to a particular embodiment, it will be understood by those skilled in the art that various changes in form and details may be made therein without departing from the spirit and scope of the invention. The corresponding structures, materials, acts and equivalents of all means or step plus function elements in the claims below are intended to include any structure, material, or acts for performing the functions in combination with other claimed elements as specifically claimed.

What I claim is:

1. An apparatus for providing a beacon signal in a wireless communication system, the apparatus comprising:
   a beacon signal generator for providing the beacon signal;
   a hybrid matrix having as an input the beacon signal and at least one traffic signal, the hybrid matrix having a plurality of output signals;
   a plurality of amplifiers having as inputs the corresponding plurality of output signals from the hybrid matrix and having as an output a plurality of amplified output signals; and
   an inverse hybrid matrix, having as inputs the plurality of amplified output signals and outputting the traffic signal and the beacon signal to a mobile station.

2. The apparatus of claim 1, wherein the hybrid matrix further comprises a Fourier Transform Matrix or a Butler Transform Matrix.

3. The apparatus of claim 1, wherein the beacon signal is input into an unused port of the hybrid matrix.

4. The apparatus of claim 1, wherein the beacon signal provides the mobile station communicating on a first communication system handoff information related to a second communication system.

5. The apparatus of claim 4, wherein the first communication system further comprises a code division multiple access (CDMA) cellular communication system.

6. The apparatus of claim 5, wherein the traffic signal further comprises a voice/data signal processed to be compatible with the CDMA cellular communication system.

7. The apparatus of claim 4, wherein the second communication system further comprises either a CDMA cellular communication system or an analog cellular communication system.

8. An apparatus for providing a beacon signal in a wireless communication system, the apparatus comprising:
   a beacon signal generator for providing the beacon signal;
   transform means, having as input the beacon signal and at least one traffic signal, for transforming the beacon signal and the at least one traffic signal into at least a first and a second transformed signals;
   a plurality of amplifying means for amplifying the first and second transformed signals; and
   inverse transform means for transforming said first and second transformed signals received from the plurality of amplifying means into the beacon signal and the at least one traffic signal originally input into the transform means.

9. The apparatus of claim 8, wherein the wireless communication system is a code division multiple access (CDMA) communication system.

10. The apparatus of claim 8, wherein the transform means and the inverse transform means further comprise either a Fourier Transform Matrix or a Butler Transform Matrix.

11. The apparatus of claim 8, wherein the first and second transformed signals each have components of the beacon signal and the at least one traffic signal thereon.

12. The apparatus of claim 8, wherein each of the plurality of amplifying means further comprise a single-tone wideband linear power amplifier.

13. The apparatus of claim 8, wherein the transform means further having as inputs the beacon signal and at least three traffic signals intended for users located in three sectors of the wireless communication system.

14. A method of providing a beacon signal in a wireless communication system, the method comprising the steps of:
   generating the beacon signal to be provided;
   transforming the beacon signal and at least one traffic signal into at least a first and a second transformed signals;
   amplifying the first and second transformed signals; and
   transforming said first and second transformed signals received from the plurality of amplifying means into the beacon signal and the at least one traffic signal originally input into the transform means.

15. The method of claim 14, wherein the wireless communication system further comprises a code division multiple access (CDMA) cellular communication system.

16. The method of claim 15, wherein the at least one traffic signal is a voice/data signal processed to be compatible with the CDMA cellular communication system.

17. The method of claim 14, wherein the wireless communication system further comprises a first wireless communication system.

18. The method of claim 17, wherein the beacon signal provides the mobile station communicating on the first wireless communication system with handoff information related to a second wireless communication system.

* * * * *